United States Patent [19]
Leftwich

[11] 3,871,843
[45] Mar. 18, 1975

[54] LIQUID FUEL VAPORIZER

[76] Inventor: Ellis Leftwich, Rt. 2, Farmville, Va. 23901

[22] Filed: Nov. 6, 1972

[21] Appl. No.: 304,141

[52] U.S. Cl. .......................... 55/259, 261/DIG. 55
[51] Int. Cl. ......................................... F02m 29/04
[58] Field of Search ................ 261/DIG. 55; 55/259

[56] References Cited
UNITED STATES PATENTS

| | | | |
|---|---|---|---|
| 1,017,186 | 2/1912 | Stewart | 261/DIG. 55 |
| 1,123,508 | 1/1915 | Farrell | 261/DIG. 55 |
| 1,316,149 | 9/1919 | Ensign | 261/DIG. 55 |
| 1,820,512 | 8/1931 | Varvel | 55/259 |
| 2,041,435 | 5/1936 | Schreurs | 261/DIG. 55 |
| 2,240,042 | 4/1941 | Kelsey et al. | 55/259 |
| 2,988,166 | 6/1961 | Klemm | 55/259 |
| 3,473,299 | 10/1969 | Powers | 55/259 |
| 3,544,290 | 10/1965 | Larson, Sr. et al. | 261/DIG. 55 |

*Primary Examiner*—Tim R. Miles
*Attorney, Agent, or Firm*—Larson, Taylor and Hinds

[57] ABSTRACT

A liquid fuel vaporizer is provided which replaces the conventional carburetor of an internal combustion engine. A mixture of gasoline and air is drawn through the bottom of a central housing in the vaporizer by way of an absorbent lining. The mixture then passes upwardly through an annular filter which serves in filtering out the oil contained in the mixture so as to produce a vapor. The resultant vapor is drawn down through a central pipe or passage in the vaporizer which is in communication with an outlet manifold. A sump is provided for oil which drains to the bottom of the vaporizer.

10 Claims, 1 Drawing Figure

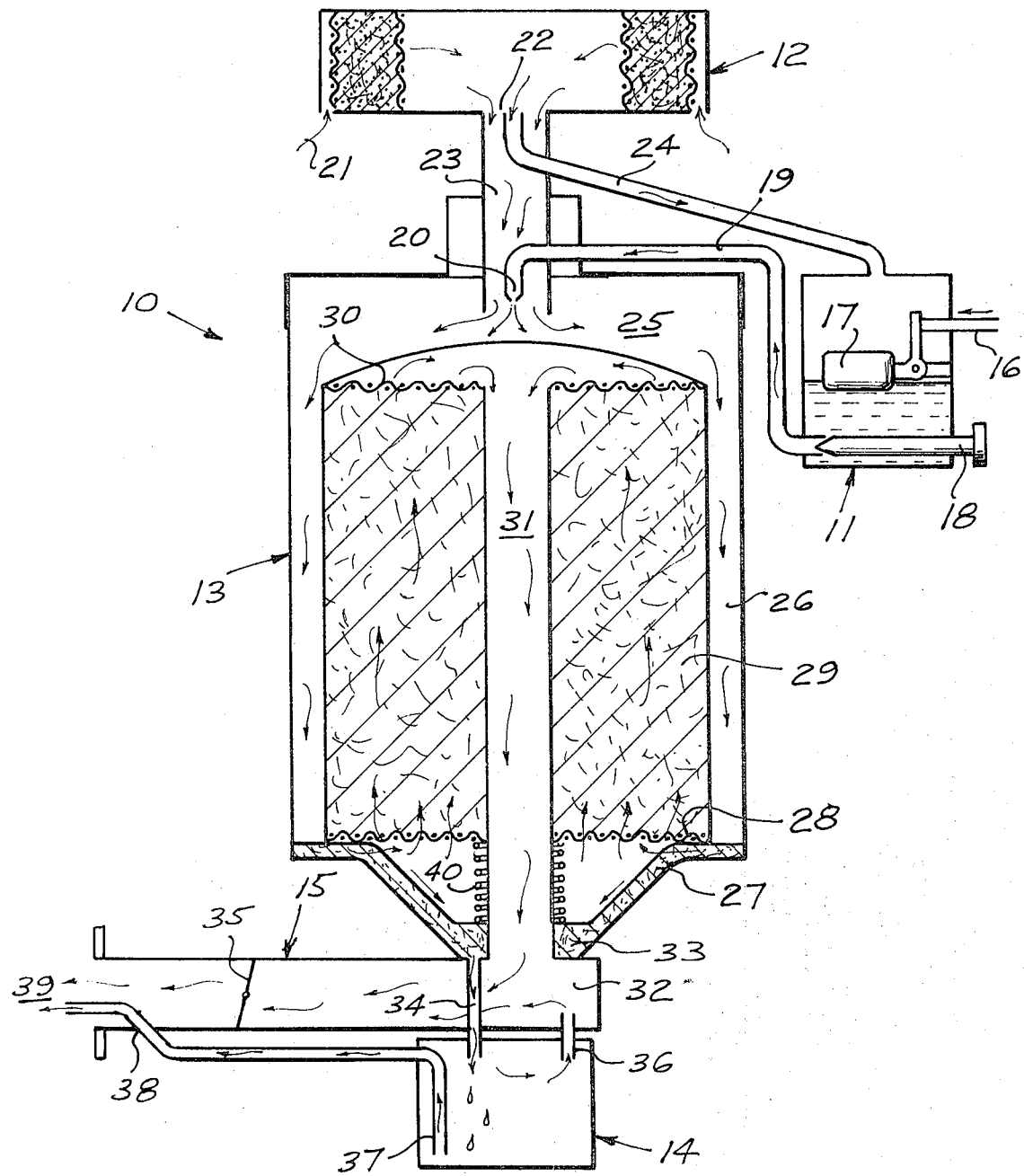

3,871,843

LIQUID FUEL VAPORIZER

This invention relates to liquid fuel engine systems, more particularly to fuel vaporizing systems.

A principle object of this invention is to provide a system of fuel vaporization in which air and gasoline is mixed, passed through a filter that separates oil out of the mixture after which a predetermined proportioning of oil rejoins the dry air and gas mixture at a point past the throttle. Another object of this invention is to provide a vaporizer of the type described in which the filter component is replaceable.

A further object of the invention is to obtain a more efficient combustable mixture.

A yet further object of the invention is to provide a fuel that will result in less pollutants.

These and other objects will be readily evident upon a study of the following specification and the accompanying drawing.

The drawing illustrating the complete process is the sole FIGURE.

The vaporizer 10, according to the invention, comprises broadly a fuel supply regulating means 11, an air filter 12, an air and fuel mixture housing 13, an oil sump 14 and a manifold 15.

The following flow process takes place.

Fuel, preferably gasoline delivered by the fuel pump passes through a pipe 16 to the reservoir of fuel regulator 11. A float valve 17 maintains the level of fuel in the usual manner. Fuel drawn in by engine vacuum is regulated by an adjustment crew 18. The fuel then passes through a pipe 19 to a port 20 inside filter housing 13.

At the same time, engine vacuum draws air into filter 12 as at arrows 21. The air divides in throat 22, partly going through to join the fuel issuing from port 20 and a small amount of air passing through pipe 24 back into the air space above float valve 17.

The mixture of air and gasoline fuel 25 is drawn down through the annular chamber 26 formed between the outer housing 13 and a central housing 40 into and through an absorbent lining 27, preferably felt. The mixture is then drawn up through a screen 28 and through filter material 29 contained in a further vertical chamber or passageway 42. Oil in the mixture is caught by filter material 29 and accumulates at the bottom ultimately passing into felt lining 27, then through a felt ring 33 which is part of the lining and thence through a drip pipe 34 into oil sump 14. Meanwhile dry vapor passing through an upper screen 30 is pulled down through a further vertical passageway formed by a central pipe or throat 31 into pipe 32 of manifold 15. Oil accumulates at the bottom of sump 14 and vapors pulled through pipe 34 are returned up through a pipe 36 into pipe 32. Oil is drawn by engine vacuum from sump 14 through a pipe 37 while gas mixture is pulled past a throttle diaphragm 35 to join the oil from pipe 37 which enters manifolds 15 at an opening 38.

The fuel mixture indicated at 39 connects directly to the engine intake manifold.

A spring 40 pressed down by screen 28 keeps felt ring 33 in place. Spring 40 is left in place when filter 29 is clogged and replaced by a fresh filter.

I claim:

1. A liquid fuel vaporizer for converting a mixture of air and liquid fuel into a dry air-fuel mixture, said vaporizer comprising a central housing, means defining an inlet located at the bottom of said housing, means within said housing defining a first elongate vertical passageway within said housing which extends substantially the full height of said housing, a filter located in said passageway for vaporizing a mixture of air and liquid fuel drawn into said vaporizer inlet, a further elongate vertical passageway, concentric with said first passageway and in communication with said first passageway at a location adjacent the top of said housing, which communicates at the outlet end thereof with an outlet manifold, and an absorbent lining located in said vaporizer inlet.

2. A vaporizer as claimed in claim 1 further comprising screen means positioned in said first passageway between said inlet and said filter.

3. A vaporizer as claimed in claim 1 further comprising first and second screens located in said first passageway at opposite ends of said filter.

4. A vaporizer as claimed in claim 1 further comprising a sump for oil collected by said filter and an outlet pipe located at the bottom of the vaporizer which provides communication between said absorbent lining and said sump.

5. A vaporizer as claimed in claim 1 wherein said further passageway comprises a central pipe and said first passageway is defined between the outer wall of said central pipe and the inner wall of said housing.

6. A vaporizer as claimed in claim 1 further comprising an outer housing which surrounds said central housing in concentric relationship therewith, said outer housing including a base wall having an outer flat portion which extends transverse to the longitudinal axis of the vaporizer and an inner inwardly inclined conical portion for collecting oil separated from the air and liquid fuel mixture, said absorbent lining being located between the lower edge of the central housing and the upper surface of the flat portion of said base wall and extending along said base wall.

7. A vaporizer as claimed in claim 1 further comprising a central inlet located above the top of said central housing for injecting air and liquid fuel into said vaporizer above the top of said central housing and an outer housing which cooperates with the outer wall of the central housing to form a further vertical passageway which provides communication between the area above the top of said central housing and said inlet to said central housing.

8. A vaporizer as claimed in claim 1 wherein said inlet comprises an annular space defined between the lower edge of said housing and an upper surface of a support for said housing.

9. A liquid fuel vaporizer system for an internal combustion engine comprising a liquid fuel supply regulating means, an air filter, and a vaporizer, which receives a mixture of liquid fuel from said fuel supply regulating means and air from said air supply, for vaporizing said mixture to produce a dry vapor mixture, said vaporizer including inlet means for injecting air and liquid fuel into an upper area in said vaporizer; means defining a first substantially vertical passage in communication at the upper end thereof with said area, down which a mixture of air and fuel is drawn; means defining a second, substantially vertical passage which communicates with the lower end of said first passage and up which said mixture is drawn; and a third substantially vertical passage which communicates with the upper end of said second passage and is in communication at the lower end thereof with an outlet manifold; and a filter located in said second vertical passage for filtering the mixture drawn up through said second vertical passage so as to produce a dry vapor mixture, said system further comprising means for collecting oil separated from said mixture of air and fuel by said filter, said collecting means comprising an absorbent lining located at the bottom of said vaporizer, a sump, and a pipe which provides communication between said lining and said sump.

10. A vaporizer system as claimed in claim 9 wherein said second and third passages are formed by an inner housing and a central pipe located within said housing, said inlet means being arranged to inject said air and liquid fuel into a space above the top of said housing and said first passageway being formed between the outer wall of said housing and the outer vaporizer wall.

* * * * *